Oct. 20, 1970    A. FOSTER ET AL    3,535,511

DERAILMENT SAFETY DEVICE

Filed March 6, 1968    2 Sheets-Sheet 1

INVENTOR.
Arthur Foster
BY Richard F. Warner

United States Patent Office 3,535,511
Patented Oct. 20, 1970

1

3,535,511
DERAILMENT SAFETY DEVICE
Arthur Foster and Richard F. Warner, Cleveland, Ohio, assignors to Torq Engineered Products Inc., Bedford, Ohio, a corporation of Ohio
Filed Mar. 6, 1968, Ser. No. 710,858
Int. Cl. B60t 17/18; B61h 13/00
U.S. Cl. 246—172                        13 Claims

ABSTRACT OF THE DISCLOSURE

A base member is suspended from the truck frame of a railway car truck inwardly of the wheel and carries a second member that extends outwardly opposite to the wheel and near the track rail adapted to contact with the track rail upon derailment of a wheel. In one embodiment the second member is in the form of a lever which opens an air valve. In another embodiment the second member forms a part of an electrical circuit which is broken when it engages a rail.

---

This invention relates to railway safety devices and more particularly to a device which will automatically cause the brakes to be applied in the event of derailment of one of the railway truck wheels from the track rail.

As is well known considerable property damage can occur, as well as loss of life, upon the derailment of a railway truck wheel. A wheel can leave the track and, if the train is not stopped immediately, cause the track to be torn up and considerable damage occur to the cars and their contents. There is normally no means for determining quickly enough the localized derailment, which may start with one wheel leaving the track, until the condition has continued to such an extent that an entire car or cars leave the track, at which time the damage may be excessive. It is also known that loss of air in a railway brake air line normally will cause the train to come to a stop. In the case of an entire car leaving the track the interconnecting air line couplings are broken causing a quick release of air pressure and a sudden stopping of the train. Sometimes the exceedingly quick stopping can also cause considerable damage. Although certain devices have been proposed to provide a warning or put on the brakes, as in Pat. Nos. 1,200,339 and 1,661,920, there have been certain economic and operational disadvantages in connection with their use which the present invention overcomes.

The present invention contemplates a safety device which is so placed relative to the railway car truck wheel or wheels that should any wheel leave the track the brakes will automatically be applied. More specifically, it includes a valve means disposed in the air brake supply line which is automatically opened by a lever engaging with the track rail when a wheel leaves the track, or by a frangible means which is a part of an electrical circuit and is broken to open the circuit when it strikes the rail. Of particular interest is the fact that the device is very economical to manufacture, easy to install and is so ruggedly designed that it is not subject to accidential operation as are the previous devices.

Still another advantage of the invention and the invention itself will become more apparent from the following description of an embodiment of the invention which is illustrated in the accompanying drawings and form a part of this specification.

2

Figure 3:
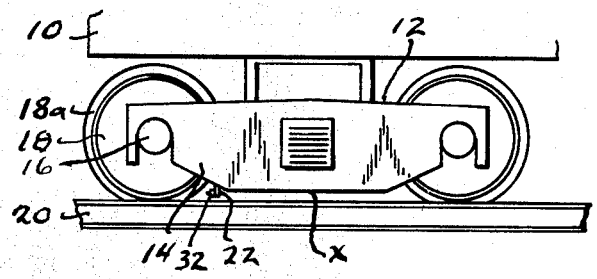

FIG. 3 is a side elevational view of a railway car truck illustrating a place where our device may be mounted.

Figure 4:
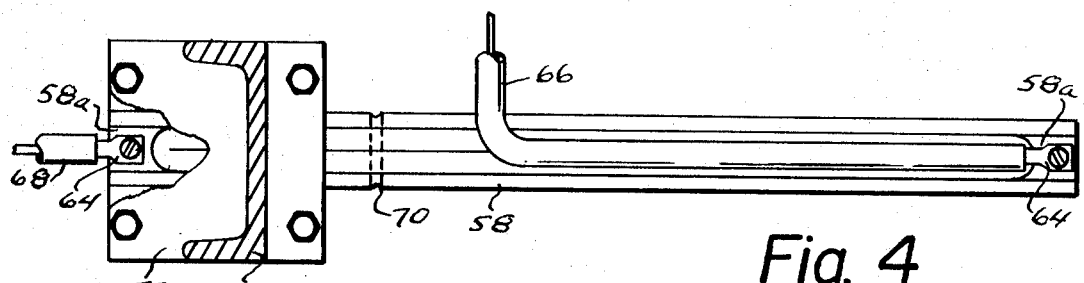

FIG. 4 is a plan view of another embodiment of the invention with parts broken away to show the underlying structure.

Figure 5:
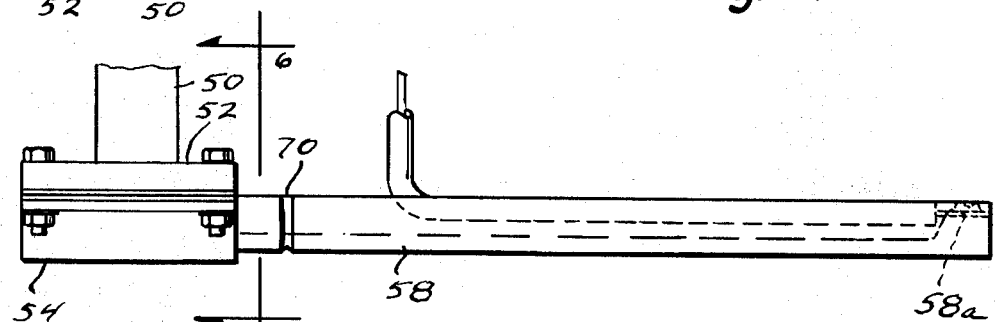

FIG. 5 is an elevational view thereof; and

Figure 6:
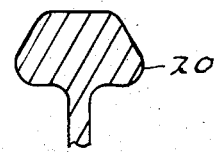
Figure 6:
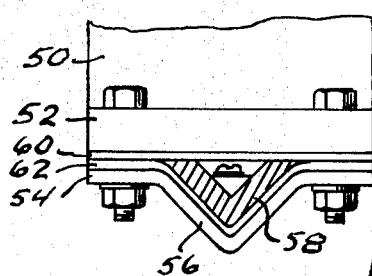

FIG. 6 is a section in the line 6—6 of FIG. 5.

More specifically, and as illustrated in FIG. 3, a railway car shown in fragment at 10 usually has pairs of trucks 12 disposed at each end of the car. The trucks include a frame 14 suitably connected to the car bed and which are supported on axles 16 that in turn are supported on wheels 18 that ride on the track rails 20.

Most track rails extend approximately 5½ to 8 inches above their supporting ties and the wheels that ride on the rails have flanges 18a extending downward on the inner side of the rails.

Figure 1:
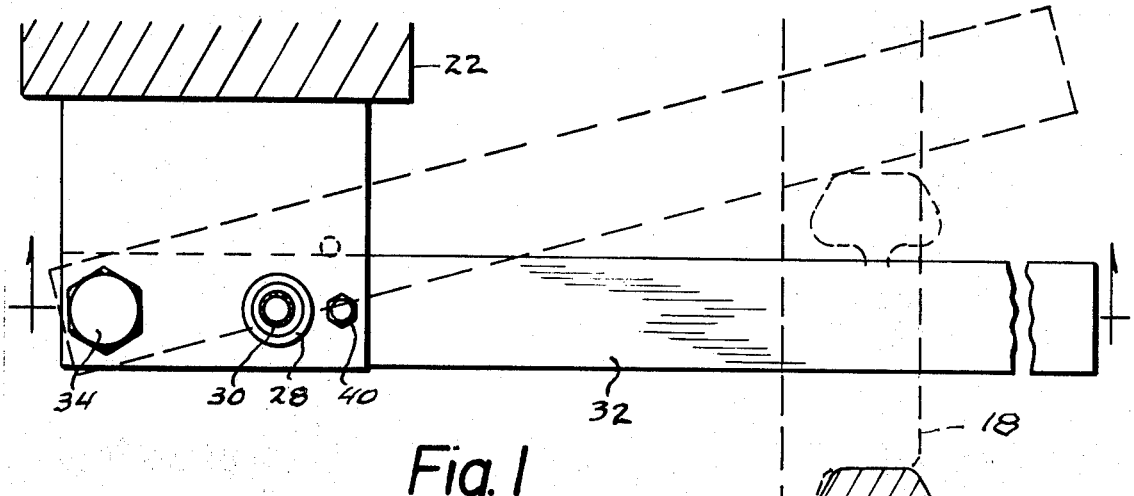
FIG. 1 is a side view of our derailment operated device showing its position relative to a track rail and illustrated in dashed lines the position the lever may take upon engagement with a rail.

As shown in FIGS. 1 and 3, the frame 14 has a downwardly extending base or bracket member 22 which is disposed in close proximity to the rail 20 and wheel 18. This base may be secured to the truck frame in any suitable manner as by bolting or welding. It is preferred that the member be disposed inwardly of the frame in order that the operating lever (later described) may extend outwardly over the rail, opposite to the wheel, as shown in FIG. 1.

Figure 2:
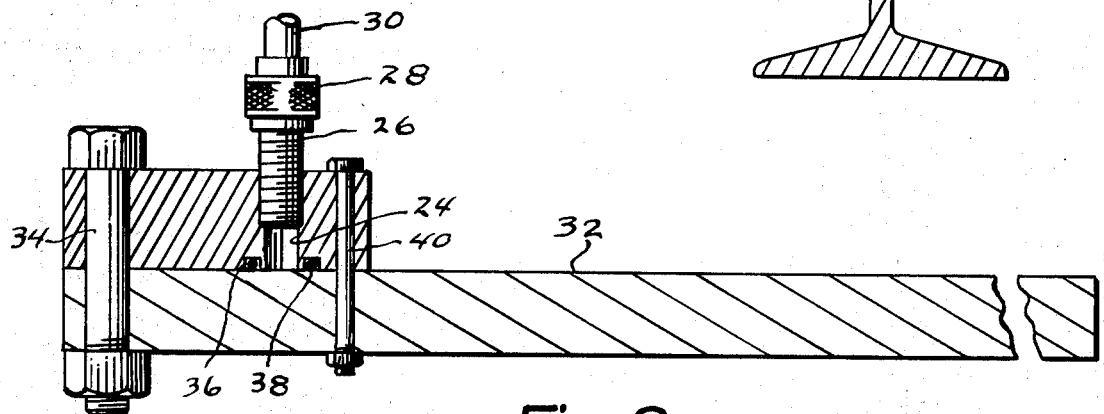
FIG. 2 is a section on the line 2—2 of FIG. 1.

As best shown in FIG. 2 the base member 22 is formed with an air duct 24 into which a nipple 26 is threaded and connected by a coupling 28 and hose 30 into the air brake air line not shown.

A lever 32 is pivotally connected to the base 22 by a pivot bolt 34 which is to one side of the duct 24 that opens toward the lever 32. A circular groove 36 surrounds the opening to the duct 24 with its inner wall spaced slightly therefrom and provides a seat for an "O" ring 38 providing an air seal around the duct opening and between the base and the lever. It is pointed out that the duct opening is spaced from the pivot 34 a sufficient distance that when the lever engages with a rail upon derailment, there is sufficient movement of the lever to cause the duct to be uncovered and the air allowed to escape.

The lever 32 is held against movement about its pivot 34 by a frangible bolt 40 which extends through the lever and base as best shown in FIG. 2.

In operation, as stated briefly before, the base 22 is located close to the wheel and rail inward of the frame and the lever 32 extending opposite the wheel and over and beyond the rail in such a position that should the wheel leave the track and drop down alongside the rail, the lever 32 will engage with the rail, break the interlock bolt 40 and move to a point beyond the position shown in dashed lines in FIG. 1. It is contemplated that this movement be sufficient that the duct 24 outlet opening be completely uncovered. In this event, air will escape through the duct and cause the brakes to be applied.

Although I have shown the locking means as being a bolt, other means such as a ball detent mechanism could be used. This would be useful after the lever has once been operated since the lever would simply be moved to its locked position. It would also facilitate the testing of the device inasmuch as it would not be necessary to remove a fragible bolt.

It will be apparent that once the device has been operated it is a simple expedient to move the lever back to its original position and replace the bolt 40. In most instances the movement of the lever is only sufficient to uncover the duct outlet and the "O" ring 38 will remain in place. However, if it is lost it is cheap and simple to replace.

The structure shown contemplates as exceedingly economical structure to manufacture since the duct 24 may be formed by a single drilling and tapping operation, the same as for the pivot point and that for the interlock bolt. If desired, spring washers or lock washers could be placed under the bolt head and nut of either one or both bolts 34 and 40 to prevent loss of the bolts by vibration and/or to cause a spring pressure between the meeting surfaces of the lever and base. It should also be noted that the duct 24 may be further out from the pivot 34 and the bolt 40 in between the duct and pivot.

It is contemplated that the duct 24 be of sufficient size to cause the air line to exit rapidly but not so rapidly as to cause extreme shock.

It is also pointed out that although the mechanism is shown disposed close to the wheel it may also be placed at an intermediate point on the truck such as the point X, thus reducing the number of devices that would need to be used for each truck. In addition the bracket 22 could be made in two parts which are bolted together to enable adjustment as to height and angle of the lever. It is also apparent that the device is very rugged and will not be "triggered" by ordinary rocks, or sticks, or snow, as would be possible with the prior art.

FIGS. 4 through 6 illustrate another embodiment of the invention which is useful as a safety device when the circuitry for the application of the brakes is principally electrical such as used in cities with electrified rapid transit systems. Usually, such trains or cars do the braking by dynamic motor braking supplemented by air brakes as the train comes toward a stopped condition.

In this instance, there is provided a safety device which conducts current in its normal state and which opens a circuit when a wheel leaves the track. It is pointed out that the circuitry used in conjunction with the device may have many ramifications, depending largely upon the particular system with which it is used and the particular invention is concerned with the safety means for opening that portion of a circuit which can be used to cause the application of dynamic braking and/or the application of the air brake.

In this instance, there is provided a vertically extending channel shaped bracket 50 which carries at its bottom end a horizontally disposed generally rectangular base plate 52.

A bottom cap 54 is secured to the base by bolts and is formed with a transversely extending V shaped seat 56 in which is disposed a channel member 58 of V shaped cross section. The channel member is made of a frangible conductive material such as cast aluminum and is insulated from the cap by sheets of insulation material 60–62, the sheet 60 extending adjacent the base 52 and the sheet 62 extending from the side flanges of 54 down under the channel member 58 and between it and the V shaped portion of the cap.

As best shown in FIGS. 4 and 5, the frangible channel member is clamped by the cap 54 to the base 52. It is provided with fillets 58a at each end having a flat upper surface to which spade type connectors 64 may be secured by screws, the connectors having lead wires 66–68 electrically connected therewith.

The bracket 50 is secured to the truck frame in any suitable manner as by welding or bolting thereto. It also may be made in two parts to enable a universal adjustment as to height as well as enable the angle of the frangible member to be varied when desired. The bracket will normally be so disposed that it is inside of the car wheels and with the frangible member extending outwardly and disposed above the rail 20 at a height sufficient that should a wheel leave the rail the member will engage with the rail and be broken.

The wires 66 and 68, being connected at the ends of the frangible member 58, a circuit may be completed through the member 58 which circuit is broken when the member breaks.

If desired, the member 58 may be provided with one or more fracture grooves 70. Although in view of its brittle nature, such grooves may not be needed.

It is also contemplated that the portion of the frangible member may be provided with a sleeve of insulating material telescoped over the end and of sufficient length to provide insulation between it and the securing means. If desired, this could be effected economically by dipping the end portion which is clamped in a suitable epoxy resin of which there are many that would be useful for this purpose.

It is apparent once the device has been operated by a derailment, it is destroyed, but is easily replaced by loosening the clamping bolts and inserting a new member to which the wires have been attached. In addition, because it extends from the base, which is inwardly of the wheel, it is not as subject to accidental breakage as by sticks, broken tree limbs and stones.

Having thus described the invention and an embodiment thereof, we are aware that numerous and extensive departures may be made therefrom without departing from the spirit or scope of the invention as defined by the appended claims.

What is claimed is:

1. A safety device for initiating the application of brakes to a track riding vehicle having a truck frame with wheels thereon comprising, a first member secured to a portion of the vehicle and a second member carried by said first member and extending into proximity with a track rail and arranged to engage with the track upon derailment of a truck wheel, said second member being electrically conductive and frangible upon impact with the track.

2. A device as described in claim 1 wherein said first member is disposed inward on the truck frame and said second member extends outward opposite said wheel.

3. A device as described in claim 1 wherein said first member includes a base member and a cap is provided secured to the base member and said second member is clamped to the base member by said cap and insulated therefrom.

4. A device as described in claim 3 wherein said frangible member has electrically conductive wires secured to each end.

5. A device as described in claim 4 wherein said frangible member is hollow and terminal portions are formed thereon at each end for connection to electrical conductors.

6. A device as described in claim 4 wherein said frangible member is in the shape of a trough and is formed at each end for connection to electrical wires and one of said wires is disposed in said trough.

7. A device as described in claim 6 wherein said trough is V shaped in cross section.

8. A safety device for initiating the application of brakes in an air brake system of a railway car or the like having a truck frame with wheels thereon, comprising a base rigidly secured to a portion of the vehicle, a lever pivotally mounted on said base and extending in proximity to the track rail, an air duct formed in said base having an opening, the central axis of which is parallel to the pivotal axis of the lever, and means connecting said duct and means connecting into the air brake system, one end of said duct being closed by said lever, said lever being arranged to move about its pivot and open the air duct upon derailment of said wheel and means cooperable with said lever to maintain said lever in a closing relationship with respect to said duct.

9. A device as described in claim 8 wherein said lever extends in close proximity to a truck wheel.

10. A device as described in claim 8 wherein said duct extends to and opens into abutting relation with said lever spaced from said pivot point.

11. A device as described in claim 10, wherein sealing means is disposed around said duct between the base and said lever.

12. A device as described in claim 8 wherein means is disposed in interlocking engagement with the base and lever to hold the lever in a predetermined position and enabling movement of the lever upon engagement with a track rail.

13. A device as described in claim 8 wherein said frangible means includes a bolt passing through an aperture in said lever.

References Cited

UNITED STATES PATENTS

| | | | |
|---|---|---|---|
| 653,634 | 7/1900 | Woodworth | 246—172 |
| 1,065,659 | 6/1913 | Bohannon | 246—172 |
| 1,200,339 | 10/1916 | Graham et al. | 246—172 |
| 1,388,483 | 8/1921 | Rasnick et al. | 246—172 |
| 1,508,216 | 9/1924 | Campbell | 246—172 |
| 1,559,809 | 11/1925 | Tonkinson | 246—172 |
| 851,465 | 4/1907 | Williams | 246—170 |
| 1,247,121 | 11/1917 | Lundy et al. | 246—170 |
| 1,253,086 | 1/1918 | O'Connell | 246—170 |
| 1,533,632 | 4/1925 | Butorac | 246—170 |
| 1,721,108 | 7/1929 | Flowers | 246—170 |
| 2,088,857 | 8/1937 | Holmes | 246—170 |
| 2,391,228 | 12/1945 | Day | 246—170 |
| 2,506,709 | 5/1950 | Donnelly | 246—171 |
| 2,536,914 | 1/1951 | Day | 246—170 |
| 3,264,471 | 8/1966 | Gaetano | 246—171 |

ARTHUR L. LA POINT, Primary Examiner

R. A. BERTSCH, Assistant Examiner

U.S. Cl. X.R.

246—172